United States Patent
Arning et al.

(10) Patent No.: US 8,341,597 B2
(45) Date of Patent: Dec. 25, 2012

(54) EDITING SOURCE CODE

(75) Inventors: Andreas Arning, Tuebingen (DE); Friedemann Schwenkreis, Leinfelden-Echterdingen (DE)

(73) Assignee: International Business Machines Corporation, Armonk, NY (US)

( * ) Notice: Subject to any disclaimer, the term of this patent is extended or adjusted under 35 U.S.C. 154(b) by 1379 days.

(21) Appl. No.: 12/015,019

(22) Filed: Jan. 16, 2008

(65) Prior Publication Data

US 2008/0172660 A1 Jul. 17, 2008

(30) Foreign Application Priority Data

Jan. 17, 2007 (EP) .................................. 07100659

(51) Int. Cl.
*G06F 9/44* (2006.01)
*G06F 9/45* (2006.01)

(52) U.S. Cl. ......... 717/110; 717/141; 717/142; 717/143
(58) Field of Classification Search .................. None
See application file for complete search history.

(56) References Cited

U.S. PATENT DOCUMENTS

| 6,594,822 B1 * | 7/2003 | Schweitz et al. ............... 717/140 |
| 7,467,376 B2 * | 12/2008 | Le Metayer et al. .......... 717/143 |
| 7,539,943 B2 * | 5/2009 | Vaidyanathan et al. ...... 715/744 |
| 2003/0226131 A1 * | 12/2003 | Li ................................. 717/110 |
| 2005/0028137 A1 * | 2/2005 | Evans et al. .................... 717/110 |
| 2005/0216898 A1 * | 9/2005 | Powell et al. ................. 717/141 |
| 2005/0229154 A1 * | 10/2005 | Hiew et al. ..................... 717/110 |
| 2006/0015863 A1 * | 1/2006 | Vaidyanathan et al. ....... 717/170 |
| 2006/0095900 A1 * | 5/2006 | Petersen et al. ............... 717/142 |
| 2006/0150150 A1 * | 7/2006 | Tiwari et al. ................... 717/110 |
| 2006/0294509 A1 * | 12/2006 | Mital et al. ..................... 717/143 |
| 2007/0250810 A1 * | 10/2007 | Tittizer et al. .................. 717/110 |
| 2007/0288887 A1 * | 12/2007 | Pepin et al. .................... 717/105 |
| 2009/0064117 A1 * | 3/2009 | Bashkansky et al. ......... 717/154 |

OTHER PUBLICATIONS

Jocelyn Simmonds, "A Comparison of Software Refactoring Tools", Vrije Universiteit Brussel, Nov. 2002, 22 pages, <ftp://ssel.vub.ac.be/tech_report/2002/vub-prog-tr-02-15.pdf>.*

Denys Poshyvanyk, "Source Code Exploration with Google", 2006 IEEE, 4 pages, <http://ieeexplore.ieee.org/stamp/stamp.jsp?tp=&arnumber=4021357>.*

(Continued)

*Primary Examiner* — Thuy Dao
*Assistant Examiner* — Cuong V Luu
(74) *Attorney, Agent, or Firm* — Cuenot, Forsythe & Kim, LLC (57) ABSTRACT

The present invention relates to the field of computer programming. More specifically the invention relates to a method and a data processing system for editing the source code of a computer program. It is an object of the present invention to provide an easy source code editing technique, by which programming errors and type errors can reliably be avoided in cases where changes to the program are supposed not to change the semantics of the program. This object is achieved according to the invention by a method for editing source code, the method comprising the steps of: receiving a modification to the source code, said modification being made by a user, determining whether the modification would change the semantics of the source code, and handling the modification depending on the result of the determining step.

14 Claims, 3 Drawing Sheets

OTHER PUBLICATIONS

Andrian Marcus, "Recovering Documentation-to-Source-Code Traceability Links using Latent Semantic Indexing", 2003 IEEE, 11 pages, <http://ieeexplore.ieee.org/stamp/stamp.jsp?tp=&arnumber=1201194>.*

Scott Vorthmann, "A Naming Specification Language for Syntax-Directed Editors", 1988 IEEE, pp. 250-257, <http://ieeexplore.ieee.org/stamp/stamp.jsp?tp=&arnumber=13071>.*

Marco Torchiano, "A comparative study on the re-documentation of existing software Code annotations vs. drawing editors", 2005 IEEE, pp. 277-286, <http://ieeexplore.ieee.org/stamp/stamp.jsp?tp=&arnumber=1541836>.*

R. Ian Bull, "Semantic Grep: Regular Expressions + Relational Abstraction", 2002 IEEE, 10 pages, <http://ieeexplore.ieee.org/stamp/stamp.jsp?tp=&arnumber=1173084>.*

* cited by examiner

EDITING SOURCE CODE

BACKGROUND OF THE INVENTION

1. Field of the Invention

The present invention relates to the field of computer programming. More specifically the invention relates to a method and a data processing system for editing the source code of a computer program. Furthermore the invention relates to a data processing program for editing source code and to a computer program product.

2. Description of the Related Art

From the prior art, a number of different source code editors are known. Such editors are computer programs, by which texts in a computer programming language can directly be edited by human software developers. There are editors, which can be used for a number of different programming languages. Other editors are adapted for a specific programming language, like Java, C++, XML, or the like. Source code editors can be realized as part of a software development system or as stand-alone application. Examples for publicly available modern source code editors are jEdit (available from www.jedit.org), or NEdit (available from nedit.org), or the editor inside the Eclipse SDK (available from www.eclipse.org). In addition, there are many more modern source code editors available as part of commercial Software Development Toolkits by several companies.

Every time a human developer edits a source code of a computer program there is the risk of accidental typing and programming errors. Both types of errors may lead to a subsequent malfunction during execution of the edited software on a computer.

It is an object of the present invention to provide an easy source code editing technique, by which programming errors and type errors can reliably be avoided. In particular the present invention is directed to avoid such errors in cases where the user introduces changes to a source code, which are supposed to leave the semantics of the source code unchanged.

BRIEF SUMMARY OF THE INVENTION

This object is achieved according to the invention by a method for editing source code, comprising the steps of receiving a modification to the source code, said modification being made by a user, determining whether the modification would change the semantics of the source code, and handling the modification depending on the result of the determining step.

The object is also achieved by a data processing system, comprising an editor for receiving a modification to the source code, said modification being made by a user, and a processor adapted for determining whether the modification would change the semantics of the source code, the editor being further adapted for handling the modification depending on the result of the determining step.

Furthermore the object is achieved by a corresponding data processing program and a computer program product.

In contrast to prior art solutions, which do not distinguish between modifications that affect the semantics and modifications that do not affect the semantics of source code, a core idea of the invention is to exactly provide such a distinction. For this purpose it is verified, e.g. during manual update of existing source code parts, whether modifications of the source code of a computer program affect the runtime semantics of the source code. Examples for such modifications are e.g. changing indentation of the source code according to personal taste, adding blank lines, changing names of variables etc. Furthermore, the source code may be modified by changes in copyright statements, or by comment lines containing timestamps and/or version information, which were automatically generated by a source code control system. The modification is handled by the editor depending on the determined result, i.e. depending on the nature of the modification.

The present invention suggests a source code editor, which can be (preferably selectively) operated in a "protected mode", in which only modifications are allowed that do not affect the semantics of the edited source code.

The main advantage of the invention is that no unwanted source code changes can occur and unexpected behavior of the resulting software can be prevented.

In a preferred embodiment of the invention the modification of the source code is rejected in case the modification would change the semantics of the source code. This is the most reliable way to avoid unwanted source code changes and the main application of the present invention. Additionally or alternatively an amendment suggestion is provided to the user, if the modification has been determined affecting the semantics of the source code.

In another preferred embodiment of the invention the determining whether the modification would change the semantics of the source code is carried out at a selectable point in time, e.g. during "manual checkpoints", for example if the user activates a "Check for semantical changes now" button of the editor software. In other words, the determining step is carried out on request. In yet another preferred embodiment of the invention the determining whether the modification would change the semantics of the source code, is carried out automatically, i.e. instantaneously after a modification is received. In other words, a "dynamic test" is provided. If both alternatives are provided, the source code editor can be used in a very flexible way, depending on the individual preferences of the user and requirements of the software development process.

The determining step can be implemented by means of a processor of the data processing system in different ways. A very reliable way of verifying that a modification does not influence the semantics of the source code is realized by compiling the unmodified source code, i.e. generating a first object code, compiling the modified source code, i.e. generating a second object code, and determining whether the generated object codes are identical. Another way is to compare the modification to be tested to a defined list of allowed modifications, which do not change the semantics of the source code ("positive list") and/or to a defined list of non-allowed modifications, which do change the semantics of the source code ("negative list").

In another embodiment of the invention an additional test is provided. In this embodiment the editor may operate in a "restricted mode", in which the editor distinguishes different sections/areas of the source code. In certain sections, changes are not allowed at all, even if those changes would not affect the semantical behavior. In this embodiment is determined whether the modification concerns source code, which is not allowed to be subject to modifications according to a defined set of rules. The determination is carried out either at any time, e.g. prior to a receiving step (i.e. certain areas are read-only and the editor does ignore any attempt to do a change in this section/area) or subsequent to the receiving step (i.e. the change is flagged or rejected later). In other words, in addition to the test whether the modifications affect the semantics of the source code, it is tested, whether the specific part of the source code, which is subject to modification, is allowed to be modified at all. If the source code must not be modified according to a defined set of rules, the modification is rejected. In other words, the test, whether modifications lead to changes in the semantics of the source code will only apply in case the modification is actually allowed. With this embodiment the number of modifications to be tested can be increased significantly, which leads to reduced system requirements.

In another embodiment of the invention a different additional test is provided. In this embodiment the editor may operate in a "relaxed mode", in which, in addition to changes without influence on the semantics, certain changes with influence on the semantics are allowed rather than rejected by the editor.

A further preferred embodiment of the invention relates to the modification itself. If the semantic analysis is carried out automatically, and a user provides a large number of keystrokes to the system, "modification boundaries" have to be determined. In other words, the editor has to determine begin and end of a modification to be analyzed. This is preferably achieved by ignoring syntactically invalid intermediate states of modifications. In other words, a modification provided by the user is not analyzed if it is not at least syntactically complete, but rather considered as partial modification. In another embodiment of the invention a number of modifications are received and combined to a more complex modification prior to the analyzing. In other words, not only each single modification is analyzed, but also more complex modifications, which are resulting from a number of elementary modifications. In this embodiment different combination of modifications are tested. Changes are allowed if one combination of modifications passes the test for semantical identity.

Preferably the user will be notified if the modification would change the semantics of the source code. A very simple but effective notification can be realized by optical markers, e.g. wavy underlines or highlighted code.

BRIEF DESCRIPTION OF THE DRAWINGS

An embodiment of the present invention will now be described with reference to the accompanying drawings, in which.

DETAILED DESCRIPTION OF THE PREFERRED EMBODIMENTS

An example of a source code editor 1 according to the present invention is described below, see FIG. 1. The editor is implemented in form of a computer program (software), adapted to be executed in a data processing system 2. The technical effects necessary according to the invention can thus be realized on the basis of the instructions of the computer program in accordance with the invention. The data processing system 2 comprises a processor 3, which is adapted for performing all tasks of calculating and computing data as well as determining and assessing results. In other words, the goals of the invention are achieved by means of a computer program comprising computer instructions adapted for carrying out the steps of the inventive method, when the software is executed in the processor 3 of the data processing system 2. The data processing system 2 and the processor 3 itself may comprise functional modules or units, which are implemented in form of hardware, software or in form of a combination of both. During operation of the data processing system 2, received data and generated and/or processed data may be transferred from one data processing module to another data processing module. For this purpose data may also be stored in data storages. The process of storing data as well as the data storage devices itself is not described in detail herein.

By way of example a Java editor, i.e. an editor adapted to edit the source code of the computer programming language Java is described. The editor 1 can be realized as a universal editor which, in case a ".java" file is opened by the editor, obtains access to a Java specific set of editor parameters, stored in a dedicated database or the like.

Preferably the editor 1 can be operated in different modes. For example in a "basic mode", the functions of the present invention will be disabled, whereas in a "protected mode" only modifications are allowed that do not change the semantics of the edited source code. Preferably the editor 1 not only comprises a selector for mode selection, but also means (e.g. realized by a user interface) for selecting the type of semantics tests, namely "permanently" (automatic test) and "on demand" (manually triggered). The number of different levels of the "protected mode" can vary, according to the requirements. In the following, a detailed description of the different levels of the "protected mode" is given.

Figure 1:
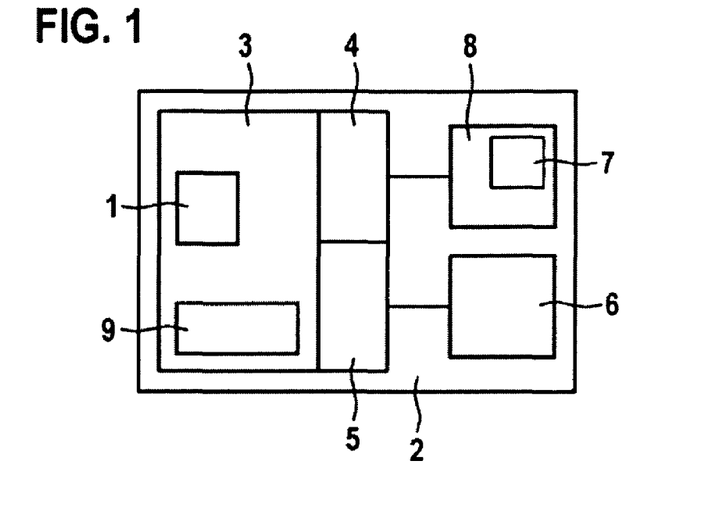
FIG. 1 shows a schematic illustration of a source code editor.

According to a first embodiment of the invention, as illustrated in FIG. 1, if a user modifies the source code of a computer program, written in Java, by means of the Java editor 1, the editor 1 receives in a first step 101 a modification to the source code, each time the user provides an input, e.g. via a keyboard, to the editor 1.

In a next step 102 it is determined in the processor 3, whether the modification would change the semantics of the source code. For this purpose the processor 3 compiles the unmodified source code, i.e. generates a first object code, and further compiles the modified source code, i.e. generates a second object code. For this purpose the processor 3 comprises compiling means 4, as they are well known per se. Subsequently the processor 3 determines whether the generated object codes are identical. For this purpose the processor 3 comprises a comparing means 5, e.g. in form of a software algorithm. Such software algorithms for comparing two object codes are also well known per se. During the comparing step irrelevant information like differences in timestamps, differences in line numbers, differences in generated identifier names etc. are ignored, since they are not relevant in this case.

In another embodiment of the invention instead of a comparing object codes, in "protected mode" the editor 1 only offers a defined list of allowed modifications, which are known not to change the semantics of the source code, and disable or hide all other functions, which can be used to modify code. Examples for allowed modifications are: replacing one white-space sequence by another white-space sequence, re-arrange indentation, adding or changing comment lines, renaming a variable which is only locally used, adding parentheses in a mathematical expression. This way, the editor 1 is adapted such that at any time the semantics are unchanged, by offering special functions, which do all required changes as one atomic operation.

In another embodiment, the editor 1 could just watch the keystrokes and recognize itself the boundaries of one operation consisting of more than one keystrokes. In this embodiment, during the editing process intermediate states may exist which are syntactical invalid. For example, if the incomplete line "int myCounter" is added, this modification would be classified invalid, and therefore not allowed. The editor 1 is preferably adapted in a way to ignore subsets of modifications, and to suppress the semantics test until the user input is at least syntactically correct. For example, adding the line "int myCounter=0;" will then be recognized as one single (and complete) editorial modification although it consists of 16 keystrokes. This way, the editor 1 discovers the most elementary boundaries of one modification automatically. However, one complex consistent modification may consist of several simple inconsistent modifications, where each simple modification leads to a syntactically correct program. Thus, the editor 1 may try to combine several simple (inconsistent) modifications to one allowed modification, and the editor 1 may therefore try several combinations.

At any time, the editor 1 will keep track of the inconsistent changes; this information is used when the user wants to persist any changes: a user's request to save a set of changes is followed immediately if all changes were consistent. However if at least one inconsistent change was found, the editor 1 will let the user know; this can be done by forcing the user to acknowledge a warning, or may have to get an approval by another person, or in certain scenarios the user may even be forced to roll back the inconsistent change before saving is permitted.

Figure 2:
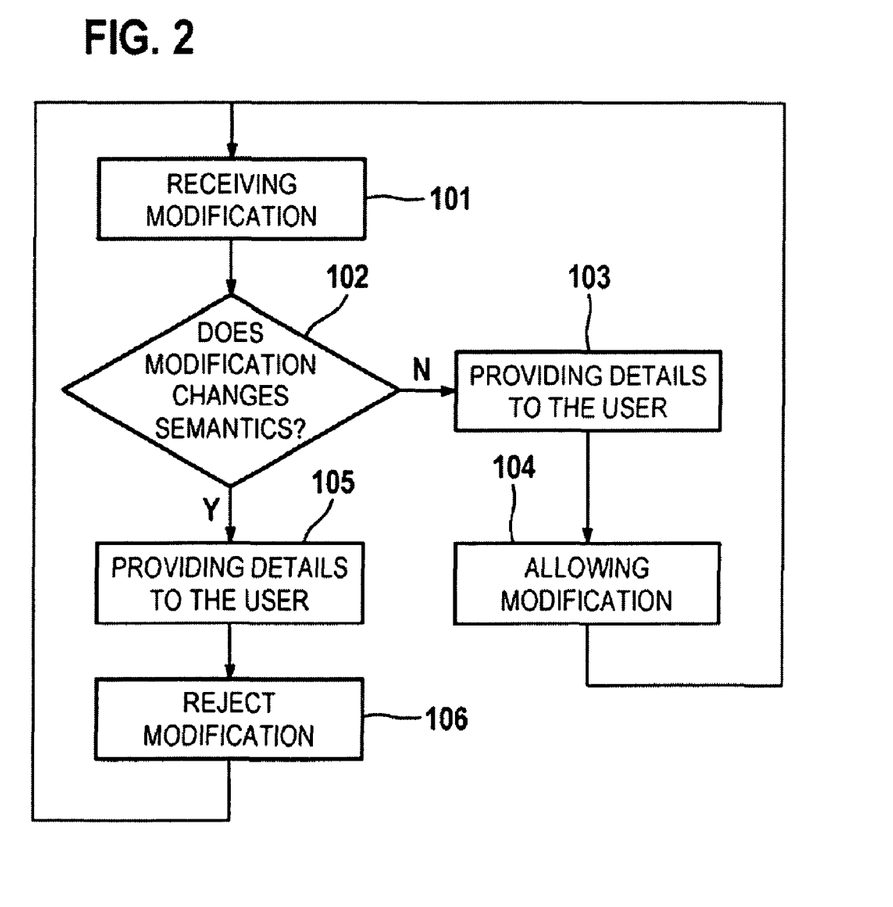
FIG. 2 shows a flow chart illustrating a first embodiment of the inventive method.

In the embodiment illustrated in FIG. 2 the determining step is carried out automatically by the processor 3 after each modification. Depending on the result of the determining step, the editor either continues in step 104 the editing process after having notified the user in step 103, or flags the modification as inconsistent in step 106 the editing process after having notified the user in step 105. In steps 103 and 105 respectively the editor 1 provides the notification to the user, e.g. via a monitor 6, which is part of the data processing system 2. Preferably the user will be notified by the editor 1 by means of an optical marker, i.e. the modified source code part is provided with wavy underlines.

This operation mode is named "permanent checking" mode. In this mode, the editor 1 allows any changes, but does permanent live parsing and warns the user about the (temporary) inconsistent changes, e.g. by underlining the code which is responsible for a semantic change. Each change of the source code is checked for semantical impacts. If the change does not impact the semantics of the source code the change is granted. Otherwise, if semantics are affected, the user gets a notification, preferably together with diagnostics.

Figure 3:
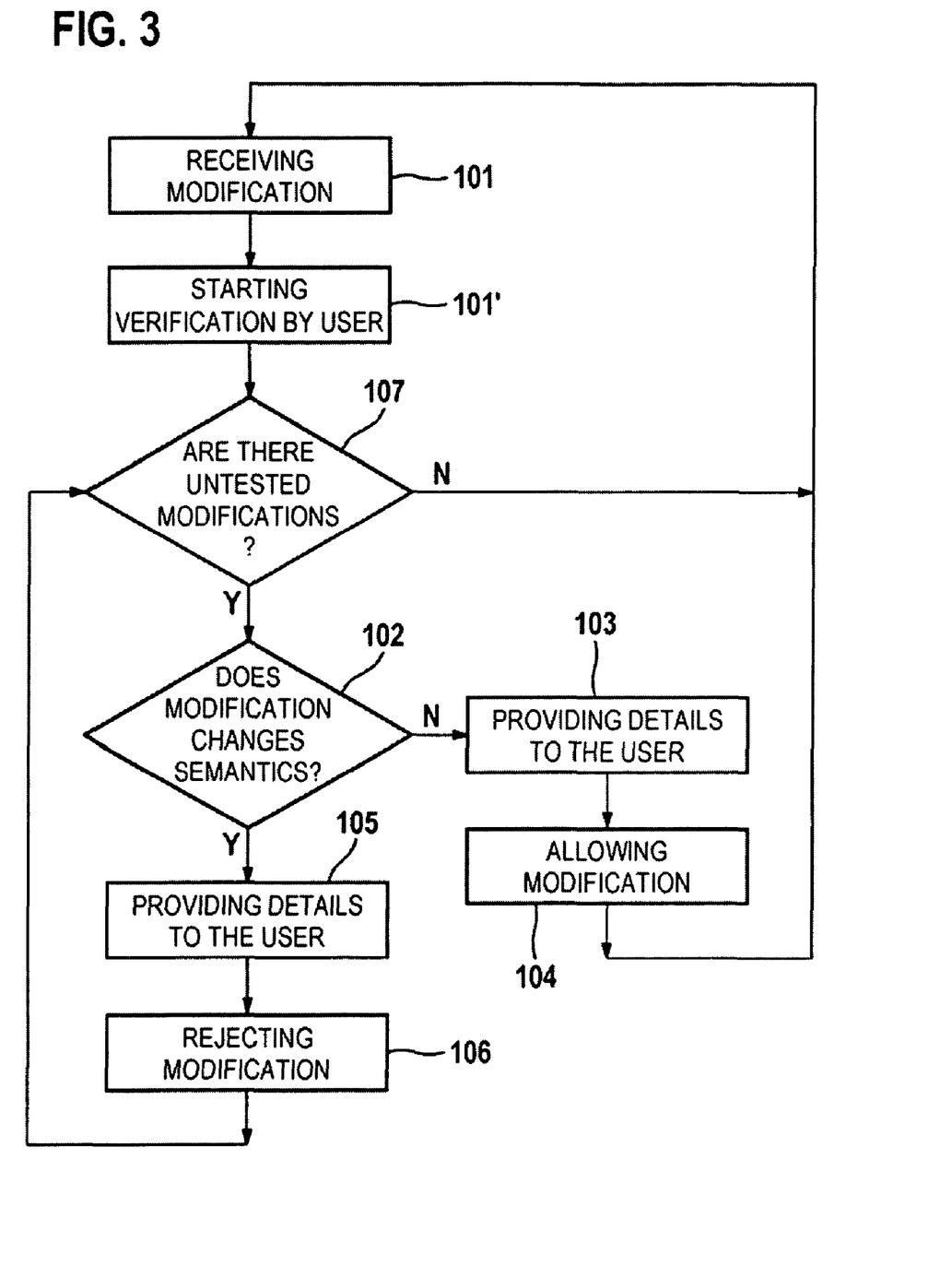
FIG. 3 shows a flow chart illustrating a second embodiment of the inventive method.

In the embodiment illustrated in FIG. 3 the determining step 102 is carried out by the processor 3 at a point in time which is selected by the user of the editor 1 in step 101'. In this case, for each modification or set of modifications (step 107) it is determined by the processor 3, whether it would change the semantics of the source code. Depending on the result of the determining step 102, the editor either continues the editing process (Step 104) or flags the modification as inconsistent (Step 106); inconsistent modifications can then be used to issue appropriate warnings, to force an undo of the inconsistent modifications or to deny requests to change the edited content.

This operation mode is named "manual checkpoints" mode. In this mode, the user can at any time request a check for semantical changes in step 101'. In some scenarios, the user wants to do some cleanup operation merely with the intention not to change any semantics. But the more prominent scenario is where the user has to do code changes, which are supposed to change semantics and as well code changes, which are not supposed to change semantics; in this case, the user conceptually changes between protected mode and unprotected mode. This can be implemented in an easy way by offering said check for semantical change as additional operation to an existing editor: For example, the user can request such a check for all modifications carried out since the last save operation, which means the editor 1 protects the user from having done unintended semantical changes since the last save operation.

For example, the user first does some preparing changes without semantical impact, e.g. inserts some white space and some Java "import" directive; to verify this change was really done without semantical impact, the user requests said check and has the processor 3 verify this; if this verification step succeeds, the user saves the changes.

Next, the user does some changes with semantical impact, e.g. insert additional code; this change is done without protection and thus just saved without requesting said check first. And finally, the user does some more changes without semantical impact, e.g. comments that explain the code change in more detail; for this set of changes, the user again requests said check, thus this set of changes is again done with protection. Said check may be a modular operation or combined with other operations, e.g. save.

The underlying techniques used for this mode are similar to the techniques used in the "permanent checking" mode. Preferably, there are no restrictions in saving the source code file. Even syntactically incorrect versions can be saved. In a simple embodiment of the invention the checking function of the editor 1 however may refuse to work with an appropriate warning when the last saved version was not at least syntactically correct.

Figure 4:
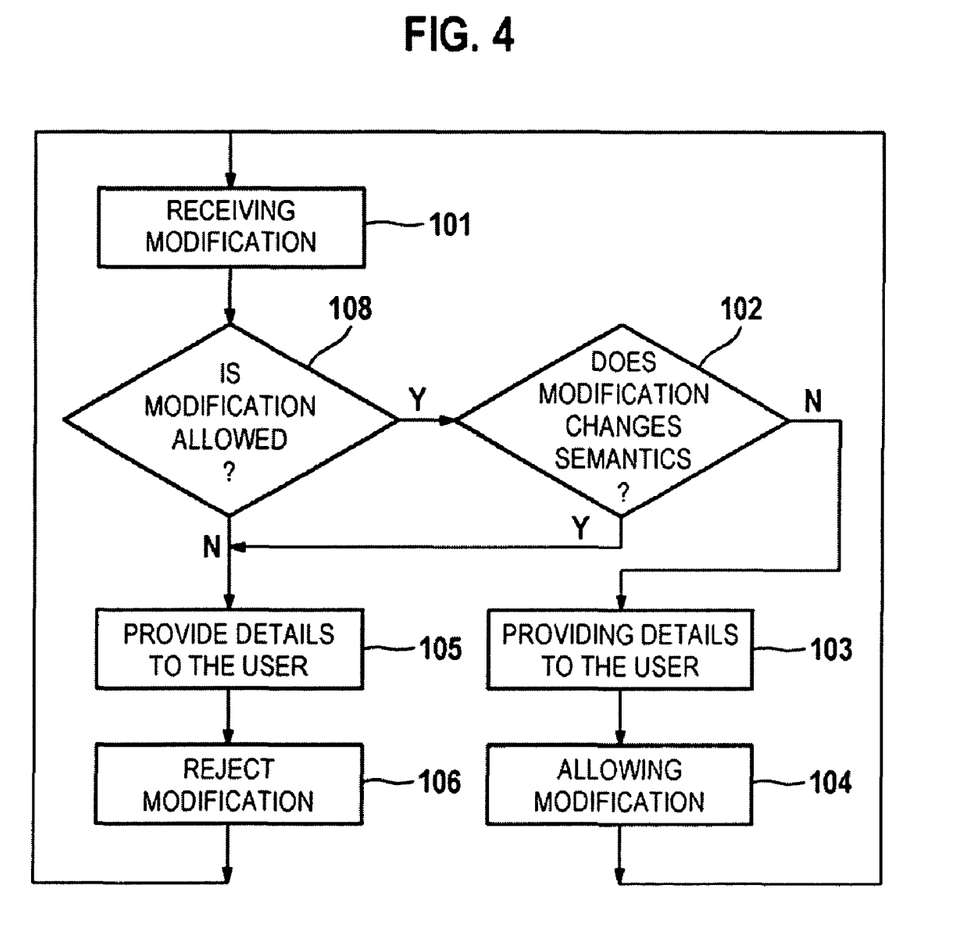
FIG. 4 shows a flow chart illustrating a third embodiment of the inventive method.

In another embodiment, see FIG. 4, an additional test is carried out in step 108 by means of the processor 3, in which it is determined prior to the receiving step 102, whether the modification concerns source code which is not allowed to be subject to modifications according to a defined set of rules 7. The predefined set of rules 7 is based on Java syntax and provided to the processor 3, e.g. through a database 8 within the data processing system 2. If the source code must not be modified according to the rules, the modification is rejected by the editor 1 in step 106. If the modification is allowed, the test procedure is continued with step 102.

In the following the embodiment employing the additional test is named "restricted" mode. In this mode, at any time the system guarantees that no semantical change is done. To achieve this goal, the following measures are taken by the editor:

Comment lines (e.g. lines starting with "//") are open for writing. When adding a newline char inside a comment line, the system ensures that the newly created line will as well be a comment line, e.g. by adding a leading "//" sequence. At the same time the comment identifier itself is either protected against being erased or modified. Optionally, erasing the comment identifier or a part of it will result in an offer to the user to remove the complete comment.

Text inside comment blocks, e.g. text starting with "/*" and ending with "*/") can be modified arbitrarily, with the exception that no additional terminating sequence "*/" can be entered. The delimiters themselves cannot be erased or modified. Optionally, erasing the comment identifiers or a piece of the comment identifiers will result in an offer to the user to remove the complete comment.

The editor 1 offers additional functionality to add a comment or delete a comment. This is required in particular when comment identifiers consist of two characters. For example, entering the character '/' on an otherwise blank line, the editor could enter the sequence "//" instead. Entering the character "*" on an otherwise blank line, the system could enter the sequence "/* */" instead.

Optionally, comments with special meaning (e.g. javadoc) may be treated by the processor 3 as protected (like program code is).

Outside of strings, any whitespace sequence can preferably be rearranged by the editor 1 by adding or removing adjacent whitespaces.

In "restricted" mode, the editor 1 offers guarded functionality to rename local variables under its control. Invalid renaming of variables (e.g. trying to use the same name for two different variables in the same scope) is rejected. Renaming of variables with semantical impact (e.g. making a referenced global variable invisible by using the same name for a local variable) is as well rejected.

In addition, in "restricted mode" the editor 1 preferably offers functionality for changes without semantical impact. For example, in an if-then-else construct, it may allow to swap "then"-part and "else"-part while adding (or removing) a negation to the condition. Or, it could allow to surround some lines of code by an iteration, which is executed exactly once yet (as preparation for really using the loop after a further change in non-protected mode).

In another embodiment an additional operating mode ("relaxed mode") is implemented. For example, a user editing a Java program may allow changes to code, which will just affect the program's written output. In this case all changes to character strings inside a call to the Java method "System.out.println(" . . . ")" are to be neglected. Thus, it is determined either prior to the receiving step (e.g. by temporarily replacing all character strings " . . . " inside all calls to that particular method by an empty string " ") or subsequent to the receiving step, whether the modification concerns source code, which is allowed to be subject to modifications according to a defined set of rules. In other words, in addition to the test whether the modifications affect the semantics of the source code, it is tested, whether the specific part of the source code, which is subject to modification, is allowed to be modified, in addition to all changes, which do not modify the semantics. In other words, the test, whether modifications lead to changes in the semantics of the source code can be customized by the user, allowing the user to specify certain additional modification patterns, which change the semantics but with low risk to introduce new errors. With this embodiment the number of allowed modifications can be increased significantly, which leads to additional situations where the invention can help while a user is editing program code. Again, this "relaxed mode" can be carried out either automatically or on demand.

Optionally, the functionality described above can be combined with one or more of the following extensions.

All advanced compiler optimization techniques, e.g. elimination of never used variables, constant folding, inlining of code etc., may be employed by the editor or the data processing system respectively, to make sure that as many versions of a program as possible are mapped to the same (optimal) code; this helps to recognize as many modifications as possible to be semantics preserving, (e.g. no matter whether a loop if formulated as "for"-loop or as "while"-loop or even implemented using goto statements), in order to avoid false alarms if possible.

Preferably the editor 1 provides a user interface 9, by which the user may configure which types of source code modifications are tolerated and which types of modifications are not tolerated. For example, changes to the javadoc may or may not be tolerated. Or, changes to string constants, i.e. a sequence of characters surrounded by string delimiters when used by a particular Java function (e.g. System.out.println( )) may be accepted even in "protected mode". Even changing a 2-parameter function to a 3-parameter function by adding a $3^{rd}$ parameter and keeping it constant for the moment may be a modification the user wants the editor 1 to tolerate. The user interface 9 is preferably adapted in a way that these selections can be made before editing, or before saving modified source code files.

In another embodiment of the invention the editor 1 may create log records, describing types of operations during an editor session; these records can be digitally signed so they cannot be manipulated. Later on, these log records can be used to verify that only certain types of changes were made.

In the editor 1 preferably a "track changes" feature is implemented, as known from prior art text editors. Using the determined information about influence of source code modifications on the semantics of the source code, the "track changes" feature is preferably implemented in a way that it distinguishes between modifications with semantical impact and modifications without semantical impact in a way that these types of changes are rendered in different ways. Code change reviews then may concentrate on those changes with semantical impact.

The present invention may be combined with source code control systems (e.g. Rational ClearCase, CMVC), which in this way may as well offer support to distinguish code changes with and code changes without semantical impact. This difference then can be used to switch behavior of the source code control system (e.g. for changes without semantical impact, the required approval process may be relaxed).

If the determining step comprises compiling the source codes, a compiler 4 has to be employed. For this purpose state of the art compilers may be used, executed in the processor 3. In the following, several aspects of using such compilers with the present invention will be discussed.

Known compilers may need access to referenced modules (e.g. imported Java interfaces and classes) in order to produce intermediate code or object code at all. However, there may be cases where the complete set of referenced modules (e.g. all jar files needed for a compile) is not available. In this case, it is suggested to employ a modified, more tolerant compiler to check for semantic changes. For example, such a modified compiler may be adapted in a way that it is assumed per default that all referenced classes and methods do really exist. In this case it is merely checked that both the saved and the current version use identical signatures when calling external code.

Furthermore, the current behavior of some compiler is to complain about unreachable code. If such a compiler is used with the present invention, it is preferred to switch off this behavior. As concrete example, there is a branch:

```
if (DocumentOldVersion) statement1
else statement2
``` and considering that the first branch that processes the "DocumentOldVersion" case was only used in the past and is no longer needed. Thus the user wants to cleanup the code and wants to change the two lines to merely this single line:

statement2

This change can be done in two phases: an unprotected phase with semantical change, where the user modifies the code to:

```
if (false) statement1
else statement2
``` and then a protected step, which is the change from these two lines to just the one line:
    statement2
which is semantically equivalent. However, some current compilers will reject the code:

```
if (false) statement1
else statement2
``` because statement1 is now unreachable code and said compilers assume that no user would intentionally want to have branches in the code, which cannot be executed at all. Thus it is necessary to switch off the compiler feature, which considers unreachable code as error.

The invention can take the form of an entirely hardware embodiment, an entirely software embodiment or an embodiment containing both hardware and software elements. In a preferred embodiment, the invention is implemented in software, which includes but is not limited to firmware, resident software, micro code, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A computer implementable method for editing source code, comprising the steps of:
    receiving a modification to the source code;
    determining whether the modification would change the semantics of the source code;
    wherein the step of determining whether the modification would change the semantics of the source code comprises the steps of: compiling the unmodified source code to produce first object code; compiling the modified source code to produce second object code; and comparing the first object code to the second object code to determine if the first and second object code are identical;
    accepting or rejecting the modification depending on the result of the step of determining whether or not the modification would change the semantics of the source code;
    further comparing the modification to a list of modifications, the list comprising modifications that do not change the semantics of the source code or modifications that do change the semantics of the source code; and
    accepting or rejecting the modification depending on the result of the step of comparing the modification to a list of modifications.

2. The computer implementable method of claim 1, further comprising the steps of:
    determining, according to a set of rules, whether the modification pertains to a portion of the source code wherein changes to the source code are not permitted; and
    rejecting the modification to the portion of the source code.

3. The computer implementable method of claim 1, further comprising the steps of:
    determining, according to a set of rules, whether the modification pertains to a portion of the source code wherein changes to the source code are permitted; and
    permitting the modification to the portion of the source code.

4. The computer implementable method of claim 1, further comprising the step of: ignoring syntactically invalid intermediate states of the modification.

5. The computer implementable method of claim 1, wherein the modification comprises a first change to the source code and a second change to the source code, further comprising the step of: combining the first change and the second change to form the modification to the source code.

6. A data processing system, comprising:
    a processor;
    a storage device coupled to said processor, the storage device comprising instructions executable by the processor and configured for:
    receiving a modification to source code;
    determining whether the modification would change the semantics of the source code;
    wherein the step of determining whether the modification would change the semantics of the source code comprises the steps of: compiling the unmodified source code to produce first object code; compiling the modified source code to produce second object code; and comparing the first object code to the second object code to determine if the first and second object code are identical;

accepting or rejecting the modification depending on the result of the step of determining whether or not the modification would change the semantics of the source code;

further comparing the modification to a list of modifications, the list comprising modifications that do not change the semantics of the source code or modifications that do change the semantics of the source code; and accepting or rejecting the modification depending on the result of the step of comparing the modification to a list of modifications.

7. The data processing system of claim 6, wherein the instructions are further configured for:

determining, according to a set of rules, whether the modification pertains to a portion of the source code wherein changes to the source code are not permitted; and rejecting the modification to the portion of the source code.

8. The data processing system of claim 6, wherein the instructions are further configured for:

determining, according to a set of rules, whether the modification pertains to a portion of the source code wherein changes to the source code are permitted; and permitting the modification to the portion of the source code.

9. The data processing system of claim 6, wherein the instructions are further configured for: ignoring syntactically invalid intermediate states of the modification.

10. The data processing system of claim 6, wherein the modification comprises a first change to the source code and a second change to the source code, and wherein the instructions are further configured for: combining the first change and the second change to form the modification to the source code.

11. A computer usable storage device embodying computer program code, the computer program code comprising computer executable instructions configured for:

receiving a modification to source code;

determining whether the modification would change the semantics of the source code;

wherein the step of determining whether the modification would change the semantics of the source code comprises the steps of: compiling the unmodified source code to produce first object code; compiling the modified source code to produce second object code; and comparing the first object code to the second object code to determine if the first and second object code are identical;

accepting or rejecting the modification depending on the result of the step of determining whether or not the modification would change the semantics of the source code;

further comparing the modification to a list of modifications, the list comprising modifications that do not change the semantics of the source code or modifications that do change the semantics of the source code; and accepting or rejecting the modification depending on the result of the step of comparing the modification to a list of modifications.

12. The computer usable storage device of claim 11, wherein the embodied computer program code further comprises computer executable instructions configured for:

determining, according to a set of rules, whether the modification pertains to a portion of the source code wherein changes to the source code are not permitted; and rejecting the modification to the portion of the source code.

13. The computer usable storage device of claim 11, wherein the embodied computer program code further comprises computer executable instructions configured for:

determining, according to a set of rules, whether the modification pertains to a portion of the source code wherein changes to the source code are permitted; and permitting the modification to the portion of the source code.

14. The computer usable storage device of claim 11, wherein the embodied computer program code further comprises computer executable instructions configured for: ignoring syntactically invalid intermediate states of the modification.

* * * * *